Feb. 17, 1953 W. C. PFEIL 2,628,853
STUFFING BOX GLAND
Filed March 13, 1948
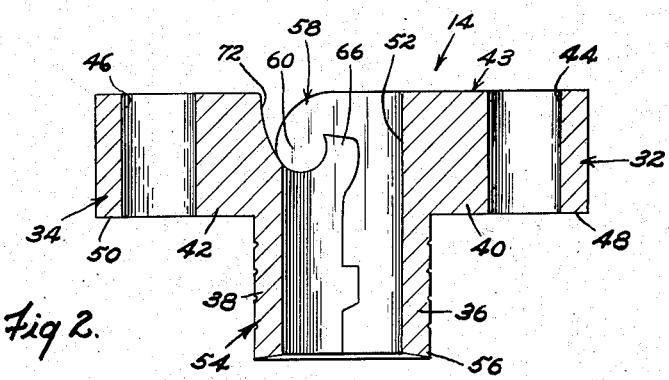
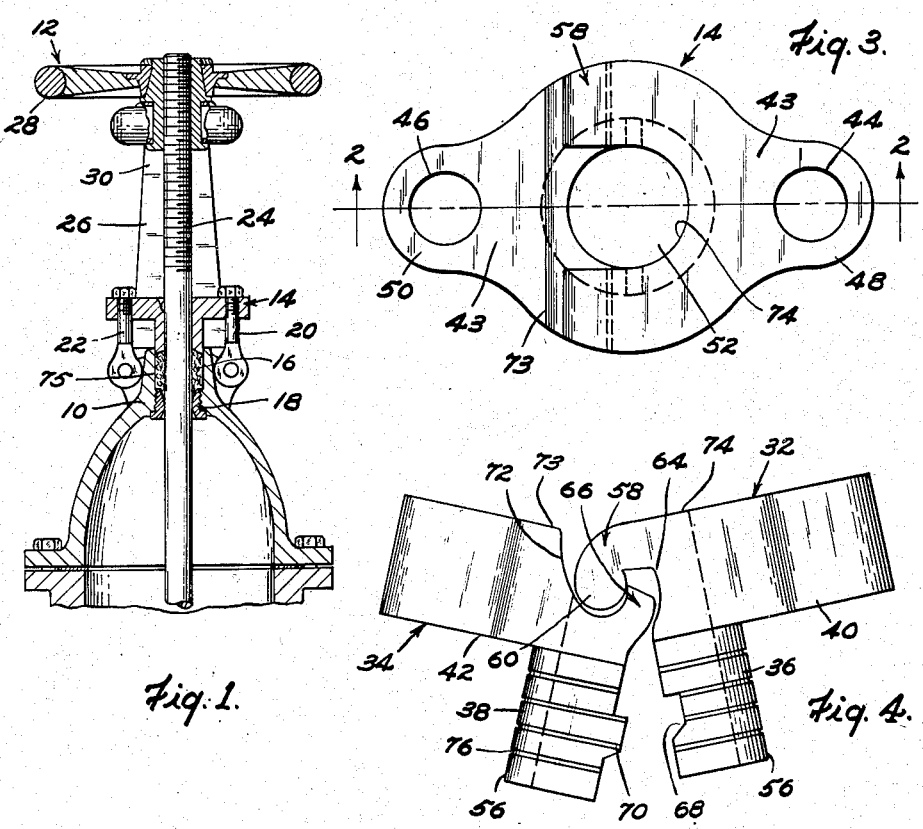
INVENTOR;
William Carl Pfeil
BY Thiess, Olson, & Mecklenburger
ATTY'S.

Patented Feb. 17, 1953

2,628,853

UNITED STATES PATENT OFFICE 2,628,853

STUFFING BOX GLAND

William Carl Pfeil, Chicago, Ill.

Application March 13, 1948, Serial No. 14,800

2 Claims. (Cl. 286—33)

1

This invention relates to packing glands and more particularly to a split type gland for use in high pressure type valves and the like.

Various types of glands have heretofore been proposed which are of such design as to eliminate the necessity for disassembling the adjacent portions of the valve when renewing the packing in the stuffing box housing. This improvement was accomplished by longitudinally splitting or dividing the gland into two cooperating sections thereby enabling the gland to be readily separated and removed from about the valve stem once the gland had been lifted clear of the stuffing box housing. It was later found, however, that the efficiency and effectiveness of the split gland, when used in a high pressure type valve, was reduced because of the difficulty encountered in producing sufficient binding between the cooperating sections of the gland so as to prevent leakage. One of the causes of this difficulty resulted from uneven tightening of the gland seating bolt nuts which tended to cause one of the sections of the gland to become slightly offset from the other, thus failing to create the necessary binding joint between the sections. A second cause of this difficulty was that in most valves only a small portion of the gland projects into the stuffing box housing and thus when the gland seating bolt nuts are pulled up tight a force is exerted on the upper or the exposed portion of the gland tending to separate the cooperating sections, thereby further increasing the possibility of a nonbinding joint.

Thus, it is one of the objects of this invention to provide an improved split type gland which maintains a binding joint between the cooperating sections of said gland once the gland is seated, regardless of the difference in pressure exerted on said sections upon tightening of the nuts of the gland seating bolts.

It is a further object of this invention to provide a split type gland whose cooperating sections will remain effectively in a binding interlocked relationship regardless of the amount the gland projects into the stuffing box housing or the amount of force exerted on the cooperating sections for seating the gland.

It is still a further object of this invention to provide an improved stuffing box gland which is effective in operation, simple in construction, and inexpensive to produce.

Further and additional objects will appear from the description, accompanying drawings and appended claims.

2

In accordance with one embodiment of this invention, a split type gland is provided having a sleeve portion and an integrally formed flange portion at one end of said sleeve portion. Extended arms of the flange portion are provided with openings adapted to receive bolts for seating the gland in the stuffing box housing. The gland comprises a pair of cooperating, longitudinally divided sections whose adjacent surfaces are deformed so that said sections may become engageable or disengageable upon relative rocking movement of said sections.

For a more complete understanding of this invention, reference should be had to the drawings, wherein:

Figure 1 is a fragmentary side elevational view of a valve assembly with a portion of the stuffing box housing cut away so as to show the manner of seating the gland therein;

Fig. 2 is an axial sectional view of the gland taken along line 2—2 of Fig. 3;

Fig. 3 is a top plan view of the gland; and

Fig. 4 is a side elevational view of the gland with the cooperating sections in a partly disengaged position.

Referring now to the drawings and more particularly to Fig. 1, there is disclosed a stuffing box 10 of a conventional high pressure type steam valve 12. Cooperating therewith are the gland 14, packing 16, and the packing retaining bushing 18 arranged in their operative positions. The gland 14, in this instance, is seated by bolts 20 and 22 which are of a swing type and may readily be swung out of the way once the gland has been lifted clear of the bolts.

Repacking of a valve often necessitates the use of a pick or some other sharp pointed instrument to pry loose the old packing from about the valve stem 24, thus the spacing 26 above the stuffing box 10 should be as clear of obstructions as possible, and therefore the removal of the gland from about the valve stem becomes desirable. The splitting or longitudinal dividing of the gland enables the gland to be removed from about the valve stem 24 without dismantling the handwheel 28 and a substantial portion of the body yoke 30 above the stuffing box housing 10.

Gland 14, as shown in Fig. 2, comprises a pair of cooperating sections 32 and 34 having sleeve portions 36 and 38 and flange portions 40 and 42, respectively, formed integrally with corresponding ends of said sleeve portions. When the sections 32 and 34 are arranged in juxtaposition, the flange portions 40 and 42 form an elongated oval shaped flange 43; openings 44 and 46 being provided in the extended portions 48 and 50 of the flange 43 for receiving the seating bolts 20 and 22. Intermediate the openings 44 and 46 is provided an aperture 52 which extends through the flange 43 and sleeve 54 and receives the valve stem 24. The sleeve 54 is cylindrical in shape and when the gland is in its operative position the lower end 56 thereof projects into the stuffing box housing 10, said end being dished out slightly so as to more effectively force the packing 16 into snug engagement with the valve stem 24.

The cooperating adjacent surfaces of sections 32 and 34 are so shaped that they interlock upon relative rocking movement of said sections. Thus the surface at each side of section 32 is formed into a talon-shaped finger 58 which extends from the flange portion 40 in a transverse direction, curving downwardly and terminating in a substantially cylindrical end 60. A groove 64 formed behind the end 60 is adapted to receive a cooperating finger 66 of section 34, as hereinafter described in greater detail. Longitudinally spaced from finger 58 and groove 64 and formed in each side of sleeve portion 36 of section 32 is a groove or notch 68 substantially rectangular in shape, which is adapted to receive a corresponding tongue 70 of section 34 when the sections are brought into cooperative relation.

The cooperating surface at each side of section 34 comprises the talon-shaped finger 66 adapted to extend upwardly into swing engagement with the groove 64 of section 32 and behind the cylindrical end 60 of finger 58. A groove 72, disposed above finger 66, is shaped to receive finger 58 of section 32 when sections 32 and 34 are brought into cooperative relation by relative rocking movement of said sections, said fingers 58 and 66 being so shaped as to be adapted to interlock with each other as seen in Figs. 2 and 4. Longitudinally spaced from finger 66 and disposed on sleeve portion 38 of section 34 is the tongue 70 which is adapted to engage the corresponding groove 68 of section 32.

When disengaging the sections 32 and 34, section 34 is rocked upwardly slightly so as to disengage the grooves 68 from the tongues 70, this rocking of section 34 continuing until fingers 58 and 66 become unlocked as shown in Fig. 4. Upon further upward movement of section 34 the two sections may be completely separated and removed from about the valve stem 24.

Thus it will be seen that when the sections are in cooperative relation they cannot be separated without first being rocked, so that if one of the seating bolts becomes loose, the two sections will still be securely locked together because of the interlocking fingers 58 and 66 and the engagement of tongues 70 with grooves 68.

Thus a gland has been provided which is of a split type and may be used where the space above the stuffing box housing is limited and which may be readily removed without dismantling the adjacent portions of the valve. Also a split type gland has been provided which retains a binding joint between the gland sections once the sections have been brought into cooperation.

It will be observed from Fig. 4 that groove 72 permits section 34 to be rocked or tilted to disengage it from section 32. Providing groove 72 cuts back edge 73 so that considerable tilting movement of section 34 in the direction of valve stem 24 is possible before edge 73 will strike the stem. Insasmuch as edge 74 of section 32 is not cut back, section 32 cannot be tilted or rocked until sleeve portion 36 is lifted far enough to clear the top edge of opening 75 in valve housing 10. The bottom of sleeve portion 36 may then be swung out as shown in this Fig. 4 at the time section 34 is rocked in order to minimize the space necessary above valve housing 10 to clear or free the sections 32 and 34. Parallel grooves 76 may be provided on sleeve portions 36 and 38 to aid a workman in determining whether both portions are seated evenly in valve stem opening 75.

While a particular embodiment of this invention is shown above, it will be understood of course, that the invention is not to be limited thereto, since many modifications may be made, and it is contemplated therefore by the appended claims to cover any such modification which falls within the true spirit and scope of this invention.

I claim:

1. A device of the character described comprising a pair of cooperating sections each having a sleeve-forming portion, a first pair of substantially talon-shaped fingers protruding substantially tangentially from the sleeve-forming portion of one of said sections and substantially adjacent one end thereof, and a second pair of complemental substantially talon-shaped fingers protruding from the sleeve-forming portion of the second section and extending substantially tangentially thereof; said first pair of fingers extending arcuately in one direction axially of said sleeve-forming portion of said first section and toward the other end thereof and terminating in substantially cylindrically shaped ends which cooperated with the adjacent surfaces of said sleeve-forming portion to form arcuate shaped pockets therein, said second pair of fingers extending arcuately in the opposite direction and axially of the sleeve-forming portion of said second section to form cooperating cylindrical seating surfaces for the cylindrical end portions of said first pair of fingers, said second section having additional surfaces formed therein which extend outwardly from said cylindrical seating surfaces to the end of said section adjacent said second pair of fingers and to a point substantially spaced from the first pair of arcuately extending fingers when the two sections are assembled, and said second pair of fingers having the ends thereof of substantially the same contour as said arcuate shaped pockets of the first section and being seatable therein to effect substantial interlocking embracement of said cylindrically shaped ends when said sections are in assembled relation, the aforesaid formation of said two pairs of fingers and the associated outwardly extending additional surfaces of said second section being such as to permit entry of the first pair of fingers into cooperative engagement with the second pair of fingers with the cylindrical end portions of the first pair of fingers properly seating in said cylindrical seating surfaces formed by the second pair of fingers and providing interlocking embracement of the two pairs of fingers when said sections are assembled together and requiring relative pivotal movement of both sections about said pairs of fingers to effect separation of said sections.

2. A device of the character described comprising a pair of cooperating sections each having a sleeve-forming portion and a flange portion formed at one end thereof, a pair of substantially talon-shaped fingers protruding from the flange portion of one of said sections and a second pair of complemental substantially talon-shaped fingers protruding from the flange portion of the second section, the fingers of each of said pairs of talon-shaped fingers extending substantially tangentially with respect to their respective sleeve-forming portions and towards the fingers extending from the other of said sleeve-forming portions, said first pair of fingers extending arcuately in one direction from said flange portion of said first section and toward the other end thereof and axially of the sleeve forming portion of said first section and terminating in substantially cylindrical end portions which cooperate with the adjacent surfaces of said flange portion to form arcuate shaped pockets therein, and said second pair of fingers extending arcuately in the opposite direction from the flange portion of said second portion and axially of the sleeve forming portion of said second section to form cooperating cylindrical seating surfaces for the cylindrical end portions of said first pair of fingers, said second section having additional surfaces formed in said flange portion which extend outwardly from said cylindrical seating surfaces to the end of said section adjacent said second pair of fingers and to a point substantially spaced from the first pair of arcuately extending fingers when the two sections are assembled, and said second pair of fingers having the ends thereof of substantially the same contour as said arcuate shaped pockets of the first section and being seatable therein to effect substantial interlocking embracement of said cylindrical end portions when said sections are in assembled relation, the aforesaid formation of said two pairs of fingers and the associated outwardly extending additional surfaces of said second section being such as to permit entry of the first pair of fingers into cooperative engagement with the second pair of fingers with the cylindrical end portions of the first pair of fingers properly seating in said cylindrical seating surfaces formed by the second pair of fingers and providing interlocking embracement of the two pairs of fingers when said sections are assembled together and requiring relative pivotal movement of both sections about said pairs of fingers to effect separation of said sections.

WILLIAM CARL PFEIL.

REFERENCES CITED

The following references are of record in the file of this patent:

UNITED STATES PATENTS

| Number | Name | Date |
|---|---|---|
| 458,453 | Goodrich | Aug. 25, 1891 |
| 706,976 | Macindoe | Aug. 12, 1902 |
| 907,597 | Hennebohle | Dec. 22, 1908 |
| 1,020,780 | Taylor | Mar. 19, 1912 |
| 1,745,667 | Fox | Feb. 4, 1930 |
| 2,302,661 | Benson | Nov. 24, 1942 |
| 2,365,378 | Benson | Dec. 19, 1944 |